May 12, 1953   J. D. KIEFFER III, ET AL   2,638,032
TELESCOPE HAVING PRISM MOVABLE FOR FOCUSING
Filed May 5, 1951
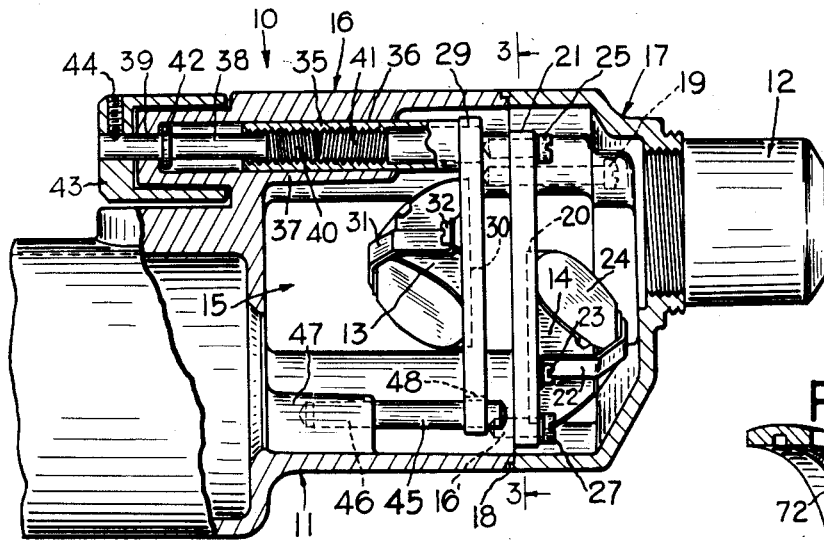
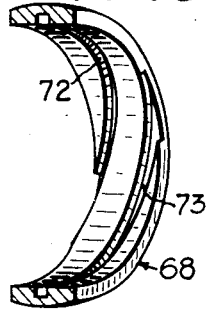
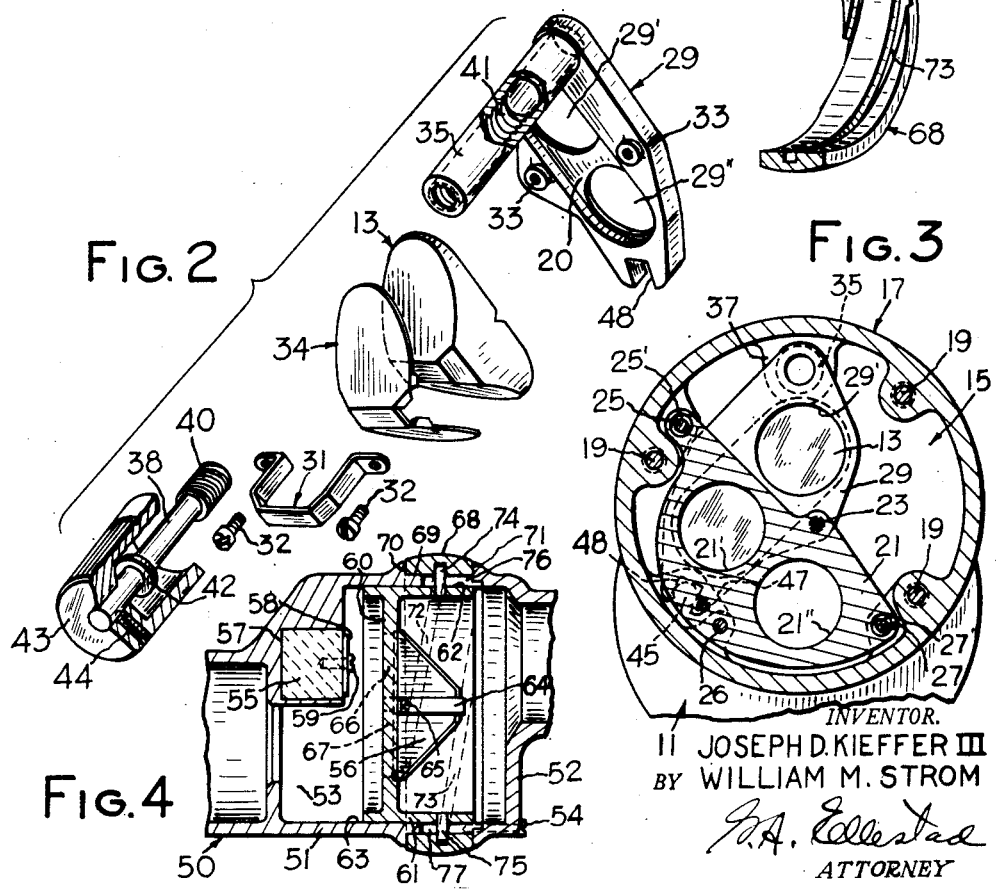
INVENTOR.
JOSEPH D. KIEFFER III
BY WILLIAM M. STROM
ATTORNEY Patented May 12, 1953

2,638,032

UNITED STATES PATENT OFFICE 2,638,032

TELESCOPE HAVING PRISM MOVABLE FOR FOCUSING

Joseph D. Kieffer III, Rochester, and William M. Strom, Irondequoit, N. Y., assignors to Bausch & Lomb Optical Company, Rochester, N. Y., a corporation of New York Application May 5, 1951, Serial No. 224,746

3 Claims. (Cl. 88—33)

This invention relates to prismatic telescopes or the like wherein the optical system is focused by moving a prism, and it relates more particularly to means for movably supporting and aligning said prism in the instrument.

In instruments of this kind, such as spotting telescopes, it is essential that the movable prism be held in correct alignment with the other elements of the optical system for all of its operative positions, yet the motion of the prism must be easy and smooth without resorting to cumbersome and complicated mounting mechanisms. Because of commercial and other considerations, the supporting structure for the movable prism must be simple, compact, light in weight and of low cost.

In view of these requirements, it is an object of this invention to provide a novel prism mounting structure for a telescope of the abovementioned type which holds the movable prism firmly in correct optical alignment with the optical system in all operating positions of said prism.

Another object is to provide such a device which is simple and inexpensive to construct and maintain, which operates smoothly, easily and reliably, and which is strong although compact and light in weight.

Further objects and advantages will be apparent in the details of construction, and the arrangement and combination of the parts by reference to the following specification and accompanying drawing in which:

Fig. 1 is a partial sectional view of the eyepiece and prism structure of a telescope embodying a preferred form of our invention, with parts shown in elevation.

Fig. 2 is an exploded perspective view of certain parts of the mechanism shown in Fig. 1, Fig. 3 is a cross-sectional view taken substantially on the line 3—3 of Fig. 1, Fig. 4 is a partial midsectional view at a reduced scale of a telescope illustrating a second embodiment of this invention, and Fig. 5 is a fragmentary perspective view of a ring member which is shown in Fig. 4.

A preferred form of this invention is embodied in a telescope, generally indicated by the numeral 10 in Fig. 1, comprising a casing or housing 11 which is provided with an objective lens (not shown) and an eyepiece 12. Between the objective and eyepiece, a prism system, such as a Porro system, comprising a pair of prisms 13 and 14 is provided to invert and revert the image formed by said objective lens. The prism system is housed in a closed chamber 15 formed cooperatively by a recess in a body member 16 and a matching recess in a cap member 17. The body 16 and cap 17 of the housing 11 are fitted together at the joint 18 and are held in assembled relation by several cap screws 19 which are seated in the cap and threaded into the body.

Prism 14 of the prism system is seated in a shallow recess 20 which is formed in a stationary shelf 21 and which has an outline shape corresponding to the peripheral shape of the prism. Sight apertures 21' and 21" are provided in the bottom of the recess 20 in alignment with the optical axis of the telescope. By means of a U-shaped spring strap or clip 22, the ends of which are secured to the shelf 21 by the prism holding screws 23, the prism 14 is clamped into its recess 20. If desired, a light shield 24, covering the angular faces of the prism 14, may be assembled beneath spring clip 22 as shown in Fig. 1. The stationary shelf 21 is mounted on the body 16 by the cap screws 25, 26, 27 extending through holes in the shelf and threaded into tapped holes 16' in corresponding bosses which protrude into the chamber 15. For the purpose of squaring prism 14 with prism 13, the screw hole in shelf 21 for the screw 26 is made a close fit with the body of the screw, and the screw holes 25' and 27' are provided with considerable clearance around the screws 25 and 27, respectively, so that the shelf may be angularly swung about the screw 26 sufficiently to effect a proper alignment of the prisms.

Focusing of the telescope is effected by mounting the prism 13 on a movable prism shelf 29 which is so mounted that it may be moved along the optical axis to vary the length of the optical path between the eyepiece 12 and objective lens, as explained in the next paragraph. Prism shelf 29 is provided with a shallow recess 30 in which prism 13 rests, similarly to prism 14 and sight apertures 29' and 29" are likewise formed in the bottom of recess 30. To retain the prism 13 in its recess 30, a U-shaped spring clip 31 straddling the apex of the prism is used. The ends of clip 31 are outturned (see Fig. 2) and are pierced to receive holding screws 32 which are threaded into tapped holes 33 in shelf 29. A light shield 34 may be inserted beneath the clip 31 to cover the angular surfaces of prism 13 if desired.

According to this invention, the movable prism shelf 29 is supported solely by a tubular support 35 which is preferably formed integrally with the shelf near one side thereof so as to provide a strong and rigid construction. Support 35 extends from the shelf 29 in a direction substantially parallel to the axis of the telescope, and the outer cylindrical surface of the support is provided with a smooth surface which is precisely fitted to slide in a smooth cylindrical bearing surface or bore 36 formed in an interior boss 37 in body 16. Shelf 29 is thereby carried in a position which is normal to the longitudinal axis throughout its movement. To provide for adequate travel of the tubular support 35, the surface 36 is made longer than necessary for accommodation of the long area of contact on the support 35. The area of contact is purposely made long to reduce the unit pressure and cramping effect between the sliding surfaces to the least amount.

Mechanism for moving the prism 13 is provided comprising an adjusting shaft 38 which is rotatably mounted on a second cylindrical bearing surface 39 on the body 16 in axial alignment with the first bearing surface 36 and the support 35. On the inner end of the shaft 38, threads 40 are formed which are engaged with cooperating threads 41 formed on the inner surface of the tubular support 35. Endwise movement of the shaft 38 in its bearing 39 in one direction is prevented by a radial integral shaft flange 42 which abuts against the body 16 at one side of the bearing, and in the other direction by a radial surface on a knob 43 which is attached to the shaft 38 at the other side of the bearing by a setscrew 44.

Angular motion of the movable prism shelf 29 about the support 35 is prevented by a guide pin 45 which is suitably anchored in a bore 46 formed in an interior boss 47 in the body 16. Pin 45 extends parallel to the support 35 and its free end is slidingly fitted into a parallel-sided open slot 48 formed in the edge of shelf 29 on the side opposite to the support 35.

When assembling the telescope 10, the body 16 with the guide pin 45 preassembled therein is placed in an upright position and the flanged end of the adjusting shaft 38 is inserted into the bore 36 so that the flange 42 lies against the bottom wall of the bore and the end of the shaft protrudes through the shaft bearing 39. Knob 43 is then slipped over the exposed end of shaft 38 and is attached thereto by setscrew 44. Next, the shelf 29 with its prism 13 assembled thereon is placed in chamber 15 and directed so that the support 35 slides into its bearing 36 and at the same time the shaft 38 is rotated to engage threads 40 with the threads 41. Meantime the open slot 48 in the shelf is guided to slip over the guide pin 45. When the longitudinal position of the movable shelf 29 has been tentatively adjusted by rotation of shaft 38, the stationary shelf 21 with its prism 14 assembled thereon is attached to the body 16 by the screws 25, 26 and 27. These screws are left loose until after the adjustments for squaring the prisms 13 and 14 to each other are completed and then the screws are tightened. Lastly, the cap 17 is placed on the body 16 and the holding screws 19 are screwed into the body.

With regard to Figs. 4 and 5, wherein another form of the invention is shown, a housing, generally indicated at 50, is provided for the telescope, said housing having a body 51 in which a prism system is held and a body cap 52. A prism chamber 53 is formed mainly within the body 51 to contain the prism system, and said body cap 52 serves to cover one end of this chamber as well as to support an eyepiece (not shown). Cap screws 54, which extend through the cap 52 and are threaded into tapped holes in the body 51, are supplied for securing the cap to the body.

For reversing and reverting the image formed by the objective lens (not shown), a Porro prism system is provided comprising a stationary prism 55 and a movable prism 56 which is moved along the optical axis to focus the instrument. A recess 57 is provided in the body 51 adjacent to the chamber 53 wherein the stationary prism 55 is secured on the optical axis of the telescope by any suitable means such as a clamp bar 58 which is in contact with the prism and clamp screws 59 which traverse the bar and are threaded into the body 51.

According to this form of the invention, prism 56 is supported on a movable shelf 60 having an integral tubular portion 61 extending longitudinally therefrom on which is formed a cylindrical bearing surface 62. A cooperating cylindrical bearing surface 63 is formed in the chamber 53 and these surfaces are slidably fitted to each other so as to assure perfect alignment of the movable prism 56 on the optical axis in all of its operating positions. To hold the prism 56 on its shelf 60, a spring clip 64 is provided, the ends of which are anchored to the shelf by screws 65 in the same manner as the prisms 13 and 14 of Fig. 1. A pair of apertures 66 and 67, centered on the optical axis, are provided in the shelf 60 at either end of the prism 56.

Mechanism is provided for moving the shelf 60 comprising a focusing ring 68 which is rotatably mounted on a cylindrical bearing surface 69 formed on the outside of the body 51. Surface 69 terminates at opposite sides in a pair of radial shoulders 70 and 71 formed, respectively, on the body 51 and cap 52 so as to confine the ring 68 longitudinally. On the interior surface of ring 68, a pair of helical cam slots 72 and 73, as best shown in Fig. 5, are formed in which a pair of slidably fitted radial pins 74 and 75 operate to move the shelf 60. The pins 74 and 75 traverse a pair of longitudinal slots 76 and 77, which are formed opposite to each other in the rear edge of the body 51, and the pins are suitably anchored in the tubular portion 61 of the shelf 60. This structure serves to prevent rotation of the shelf 60 as well as to provide the application of a balanced longitudinal force to move the shelf when the ring 68 is rotated.

Assembly of this form of the invention is accomplished by first securing the stationary prism 55 in its recess 57 by applying the clamp bar 58 to the prism and inserting the screws 59. Prism 56 is then secured by the clip 64 and screws 65 to the shelf 56 and the pins 74 and 75 are pressed into the tubular portion 61 after which this subassembly is placed in the chamber 53 with the pins 74 and 75 engaging the longitudinal slots 76 and 77. The helical slots 72 and 73 on the focusing ring 68 are engaged with the projecting ends of the pins 74 and 75 and the ring is screwed up against the shoulder 70. Finally the cap 52 is set in place to confine the ring and cover the chamber and the holding screws 54 are screwed into the body 51.

In the mechanism heretofore described, certain characteristics are readily apparent, namely, that additional rigidity of the movable prism mounting is gained primarily by using a comparatively large tubular support as the sole shelf supporting element which per se is a rigid structure, and secondly by forming the support integrally with its shelf. An equally important advantage resides in the long smooth cylindrical bearing surface on the support which facilitates smooth operation and which may be closely fitted to obtain perfection of alignment in all of its operative positions while being very economical to produce by modern manufacturing methods. By concentric arrangement of said bearing surfaces, compactness is achieved and a direct, coaxial thrust is transmitted between the operating parts of the prism moving mechanism.

Although but certain forms of our invention have been shown and described in detail, other forms are possible and changes may be made in the shape and arrangement of its parts without departing from the spirit of the invention as defined in the appended claims.

We claim:

1. A prismatic type telescope comprising a casing and a prism movable therein along the optical axis of the instrument to change its focus, means for supporting and aligning said prism including a movable prism shelf on which the prism is held, an elongated tubular support member joined rigidly to said shelf and projecting therefrom substantially parallel to said optical axis, said member being slidably mounted on a cylindrical bearing surface carried by the casing, a second cylindrical bearing surface carried by the casing, an adjusting member rotatably mounted on said second bearing surface, the axes of said cylindrical surfaces and said member being substantially coincident, and helical cam means on the adjusting member operably connected to the support member whereby rotation of the adjusting member effects longitudinal movement of the shelf.

2. In a telescope the combination of a casing provided with objective and eyepiece lenses and a prism system located between said lenses to invert and revert the image formed by the objective lens, one prism of the system being movable along the optical axis of the telescope to change its focus, a movable prism shelf for holding said prism, said shelf having at one side an integral tubular support extending normal to the shelf and at the other side a longitudinal slot, the support being slidably fitted on its exterior surface into a longitudinal bearing surface in said casing so as to provide means for supporting and longitudinally aligning the shelf in the casing, a guide pin anchored in the casing parallel to said support and having a sliding fit with said slot so as to prevent angular movement of the shelf about the support, a rotatable adjusting shaft held against relative endwise motion in the casing coaxially with the support, and a threaded connection formed cooperatively on the interior surface of the tubular support and the adjacent end of said shaft for moving the shelf upon rotation of the shaft whereby the instrument may be focused.

3. In a prismatic telescope having a casing and an optical system including a prism which is movably mounted within the casing, a shelf carrying the prism, an elongated tubular support member secured to the shelf, a boss formed integrally with and inside of the casing, said boss having a cylindrical bore within which said tubular support member is slidably mounted, a shaft rotatably mounted on the boss and positioned within the tubular support member, said shaft, support member and bore being coaxial, and cooperating threaded portions on the shaft and support member whereby rotation of the shaft will move the shelf and prism to effect focusing adjustments of the telescope.

JOSEPH D. KIEFFER, III.
WILLIAM M. STROM.

References Cited in the file of this patent

UNITED STATES PATENTS

| Number | Name | Date |
|--------|------|------|
| 2,100,967 | Levy | Nov. 30, 1939 |
| 2,277,065 | Bock | Mar. 24, 1942 |